United States Patent [19]

Matthews

[11] Patent Number: 5,305,201
[45] Date of Patent: Apr. 19, 1994

[54] IMPROVED SYSTEM FOR MONITORING PLAY OF A GOLFER

[76] Inventor: Gordon Matthews, 100 Westlake Dr., Austin, Tex. 78746

[21] Appl. No.: 825,519

[22] Filed: Jan. 24, 1992

Related U.S. Application Data

[63] Continuation-in-part of Ser. No. 464,897, Jan. 16, 1990, Pat. No. 5,097,416.

[51] Int. Cl.⁵ .................. G06F 15/28; G08B 23/00; A63B 67/02
[52] U.S. Cl. ............................ 364/410; 364/411; 340/323 R; 340/993; 273/176 L
[58] Field of Search .......... 364/410, 709.1, 710, 364/411; 340/323 R, 993; 273/176 L

[56] References Cited

U.S. PATENT DOCUMENTS

| | | | |
|---|---|---|---|
| 3,472,333 | 10/1969 | Loewenstern, Jr. | 180/98 |
| 3,662,267 | 5/1972 | Reed | 325/53 |
| 4,002,983 | 1/1977 | Kavalir et al. | 325/54 |
| 4,142,680 | 3/1979 | Oswald et al. | 235/92 |
| 4,303,243 | 12/1981 | Wolfe | 273/176 |
| 4,396,904 | 8/1983 | Hanaoka | 340/309 |
| 4,415,065 | 11/1983 | Sandstedt | 186/39 |
| 4,419,655 | 12/1983 | May | 340/323 |
| 4,656,476 | 4/1987 | Tavtigian | 340/993 |
| 4,701,760 | 10/1987 | Raoux | 340/993 |
| 4,702,342 | 10/1987 | Hale | 180/333 |
| 4,857,886 | 8/1989 | Crews | 340/323 |
| 4,926,161 | 5/1990 | Cupp | 340/572 |
| 5,086,390 | 2/1992 | Matthews | 364/410 |

FOREIGN PATENT DOCUMENTS 0095374 5/1985 Japan.
2207787 2/1989 United Kingdom.
2240895 8/1991 United Kingdom.

Primary Examiner—Roy N. Envall, Jr.
Assistant Examiner—Gita D. Shingala
Attorney, Agent, or Firm—Baker & Botts

[57] ABSTRACT

A system for monitoring play of a golfer (24, 26) comprises Location Information Transmitters (LIT) (54, 56) at predetermined locations within a golf course and a Mobile Electronic Transmitter/Receiver (METAR) (48, 50) carried in association with a golfer (24, 26) on a golf cart (28) or golf bag (32). A METAR (48) periodically transmits a METAR code over a restricted transmission range (300). In response to the METAR (48) being proximate to a LIT (54), LIT (54) receives the METAR code. After receiving the METAR code, LIT (54) transmits a play monitoring signal including its LIT code and the received METAR code to a Tracking Center (227) located in a clubhouse (22). Golf course personnel in the clubhouse (22) can monitor a display terminal (242) of the Tracking Center (227) and determine play of golfers (24, 26), use of golf carts (28, 34) and use of golf holes (10, 14). If a golfer (24) causes a slow play condition, the Tracking Center (227) is notified and the golfer (24) is asked to increase the rate of play or leave the golf course. Additionally, in response to METAR (48) receiving a signal from an LIT (54) associated with a particular hole, METAR (48) can count down the time allotted to play that hole, and notify golfer (24) if that time is exceeded.

39 Claims, 11 Drawing Sheets

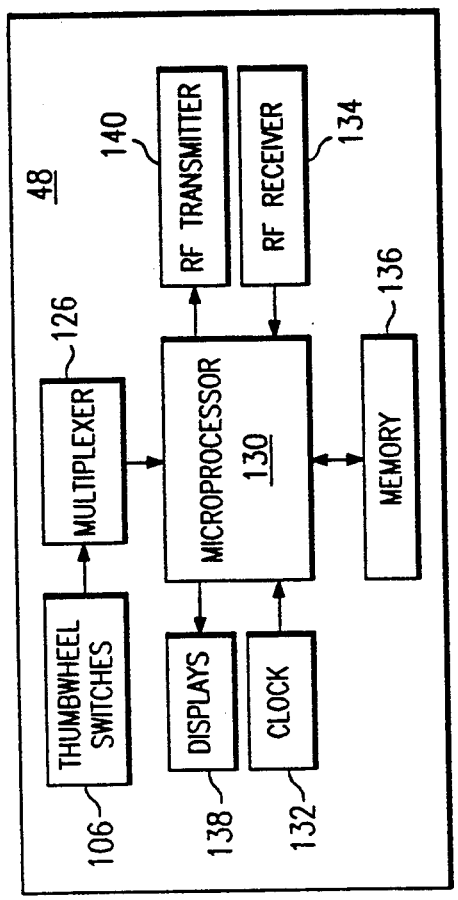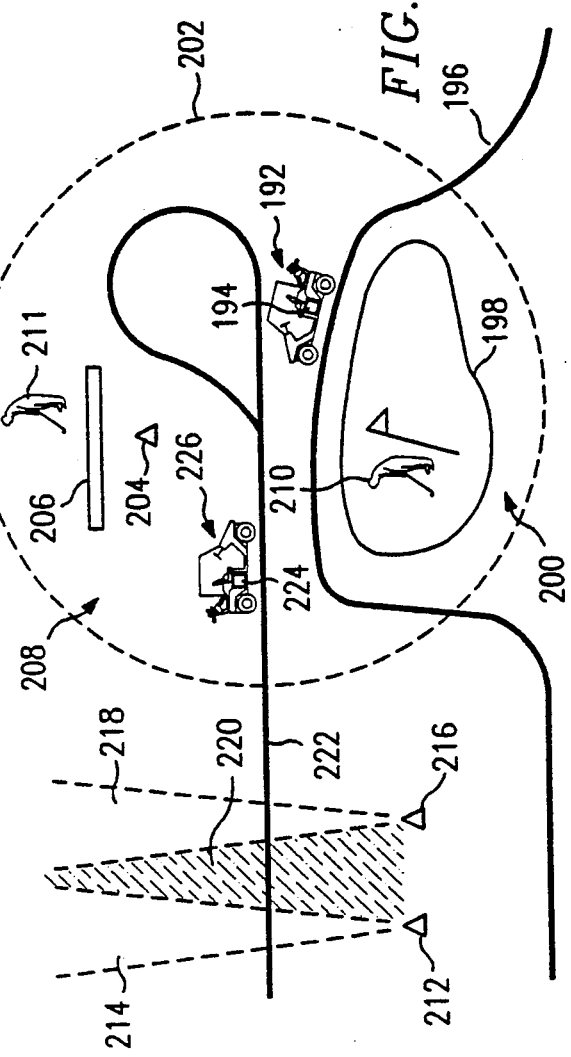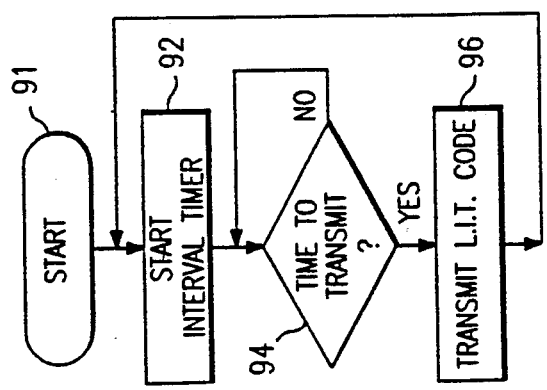

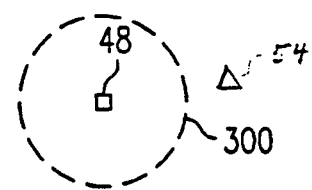
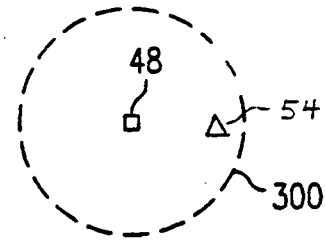
FIG. 15a    FIG. 15b
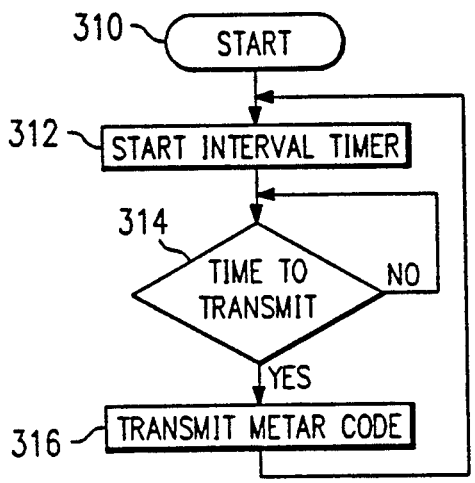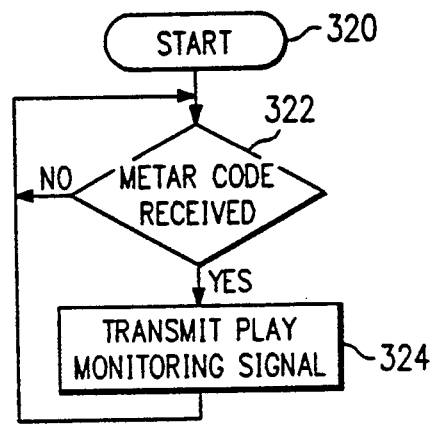
FIG. 16    FIG. 17
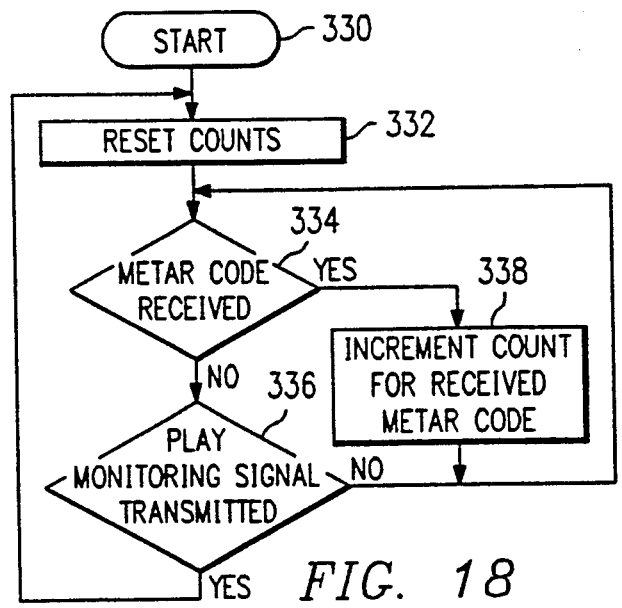
FIG. 18

IMPROVED SYSTEM FOR MONITORING PLAY OF A GOLFER

RELATED PATENT APPLICATIONS

This application is a continuation-in-part application of co-pending application for U.S. Letters Pat. Ser. No. 07/464,897, filed Jan. 16, 1990, issued Mar. 17, 1992 as U.S. Pat. No. 5,097,416 and entitled "SYSTEM FOR MONITORING PLAY OF A GOLFER".

TECHNICAL FIELD OF THE INVENTION

This invention pertains in general to systems for managing golf courses and more particularly to a system for monitoring play of a golfer, and golf cart and golf hole utilization in a golf course.

BACKGROUND OF THE INVENTION

Golf is increasing in popularity to an extent that available golf courses are becoming crowded. It is thus important that golfers play at reasonable speeds to allow others to enjoy the golf course. Slow play by some players has thus become a significant problem, in that only a few slow players can delay many subsequent players.

The ideal round of golf requires approximately four hours to complete, but slow golfers often cause a round to take five or even six hours. Most golfers are thus upset by a five or six hour round of golf caused by excessive delays from slower players. Slow golfers disrupt the pace of other golfers, resulting in frustration and poorer scores. Many golfers refuse to play in crowded golf courses because slow play is more likely. Slow play reduces the number of golfers able to use a golf course, resulting in loss of revenue for the golf course.

Various attempts have been made to eliminate slow play. A golf course employee will sometimes personally observe golfers and detect slow play, but this method is expensive, inefficient, and disruptive. The employee can observe only one location at a time, and excessive employees may appear overbearing, as well as being expensive. Attempts to educate golfers regarding slow play have generally failed.

Moreover, due to an inability to monitor the play of all players on a course, golf courses are often not able to efficiently utilize their courses, thus reducing the available income from the courses.

Therefore, a need has arisen for a system to automatically and unobtrusively monitor play of a golfer and to notify the golfer and golf course personnel of slow play.

SUMMARY OF THE INVENTION

The present invention disclosed and claimed herein describes a system and method for monitoring play of a golfer. It is a technical advantage of this invention that problems created by slow golfers are substantially eliminated. It is a further advantage of the present invention that information regarding the play of a golfer enables golf course personnel to study utilization of golf carts and golf holes within the golf course.

In one aspect of the invention, a golfer is notified of a slow play condition. It is a technical advantage of this aspect of the invention that a golfer is automatically warned when to take corrective action by increasing the speed of play.

In another aspect of the invention, golf course personnel are also notified of a slow play condition. It is a technical advantage of this aspect of the invention that golf course personnel are immediately alerted when to direct corrective action.

In still another aspect of the invention, information regarding play of a golfer is reported and stored for retrieval at a later time. It is a technical advantage of this aspect of the invention that slow play of a particular golfer can be documented and proved.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a logic flow diagram of the LIT operation;

FIG. 6 illustrates a block diagram of the METAR;

FIG. 8 illustrates the use of two LIT's at a single golf course location;

FIGS. 15a-b illustrate another exemplary embodiment of the METAR and the LIT operation;

FIG. 16 illustrates a logic flow diagram of the METAR operation according to the approach of FIGS. 15a-b;

FIG. 17 illustrates a first exemplary logic flow diagram of the LIT operation according to the approach of FIGS. 15a-b;

FIG. 18 illustrates a second exemplary logic flow diagram of the LIT operation according to the approach of FIGS. 15a-b;

FIG. 20b illustrates a logic flow diagram of the Tracking Center operation according to the approach of FIG. 20a;

FIG. 21b illustrates a logic flow diagram of the Tracking Center operation according to the approach of FIG. 21a;

FIG. 23b illustrates a logic flow diagram of the Tracking Center operation according to the approach of FIG. 23a.

DETAILED DESCRIPTION OF THE INVENTION

Figure 1:
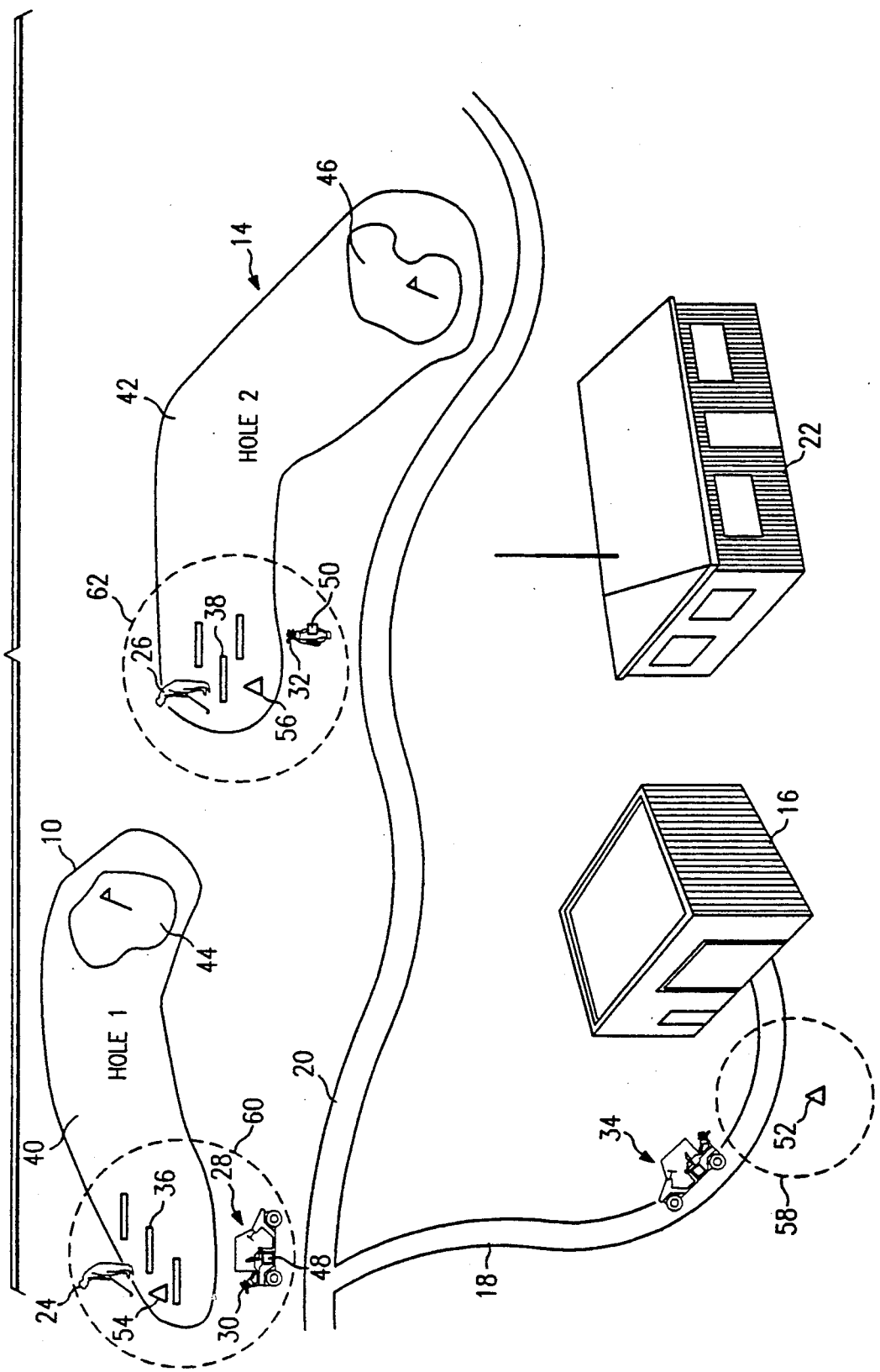
FIG. 1 illustrates a typical golf course equipped with the present invention.

The preferred embodiment of the present invention is best understood by referring to FIGS. 1-23 of the drawings, like numerals being used for like and corresponding parts of the drawing. FIGURE I illustrates a typical golf course equipped with the present invention. The golf course contains numerous golf holes such as those indicated generally at 10 and 14, a golf cart barn 16, golf cart pathways 18 and 20, and a clubhouse 22. Additional golf holes included in the golf course are not shown in FIG. 1 but are of similar design as golf holes 10 and 14. Clubhouse 22 typically contains offices for golf course personnel and a golf shop which sells equipment. Golfers 24 and 26 usually enter clubhouse 22 prior to playing a round of golf. Golf carts such as those indicated generally at 28 and 34 are stored and maintained in golf cart barn 16. These golf carts 28 and 34 travel throughout the golf course along golf cart pathways 18 and 20. A golfer 24 may rent golf cart 28 for transportation of golfer 24 and golf clubs 30. Alternatively, golfer 26 may choose to carry golf clubs 32 without aid of a golf cart.

Golf holes 10 and 14 include tee box areas 36 and 38, fairways 40 and 42, and greens 44 and 46. Golfers 24 and 26 sequentially proceed through the various golf holes 10 and 14 of the golf course, usually playing a total of eighteen golf holes. At typical golf hole 10, golfer 24 begins play at tee box area 36 and proceeds to fairway 40, green 44 and ultimately to tee box area 38 of the next hole 14, where the play is continued in the same pattern.

In operation of the basic embodiment of the present invention, golfers 24 and 26 each have a transmitter device, known as a Mobile Electronic Transmitter/Receiver (METAR), 48 and 50 attached to either golf cart 28 or golf bag 32. Each METAR 48 and 50 receives data signals from a second type of transmitter and measures how long it takes golfer 24 and 26 to play golf hole 10 and 14. Transmitters of the second type, known as Location Information Transmitters (LIT's), 54 and 56 are placed within or adjacent to tee box areas 36 and 38, or in an alternative embodiment, adjacent greens or other areas. Each LIT transmits a signal representative of the location of the LIT to any METAR 48 and 50 within a specified low power RF transmission range indicated by dotted circles 60 and 62. If the play of golfer 24 at hole 10 exceeds a predetermined amount of time (stored in the memory of METAR 48), he is notified by an indicator on METAR 48 of his slow play.

In one embodiment, an additional transmitter 52, called a course data transmitter (CDT) and similar to an LIT, is located adjacent to cart path 18 near cart barn 16. Course data (such as time allocated to each hole) is entered into the CDT by golf course personnel and the information is transmitted to any METAR passing through its low power RF transmission range 58. Each METAR then stores the information in its memory.

In the preferred embodiment shown in FIG. 1, METAR's 48 and 50 of the basic embodiment previously detailed are supplemented with transmitters to transmit unique identification signals to LIT's 54 and 56 which, in this embodiment, include receivers to receive the METAR transmissions. Each LIT transmitter also has the ability to transmit high power signals. Club house 22 contains a Tracking Center with a receiver for receiving the high power signals from the LIT'S, a timer for timing golf play, and a display for monitoring the location and playing speed of each METAR which is associated with a golfer.

In operation, each LIT 54 periodically transmits a coded signal representing the location of LIT 54, such as a hole number. When golfer 24 with METAR 48 comes into range 60 of LIT 54, the circuitry of METAR 48 decodes the received signal and retrieves from its memory the length of time allotted for golfer 24 to play hole 10. A countdown time in METAR 48 is then set to the allotted time and begun. When the timer reaches zero, indicating that golfer 24 has exceeded the allotted time for hole 10, METAR 48 notifies golfer 24 of the slow play. If golfer 24 completes hole 10 and crosses into range 62 of the next hole 14 before the count on the timer expires, the timer resets to the time allotted for hole 14 and the process continues for hole 14 and each subsequent hole.

The transmitter in LIT 54 also transmits a high powered signal to the Tracking Center indicating the identity of METAR 48 and its location. In this manner, golf course personnel can monitor the location of each golfer and identify any slow players. If necessary, a golf course employee can immediately request the slow player to increase the speed of play. Furthermore, habitual slow play can be documented and the player later reprimanded or disciplined.

Figure 2:
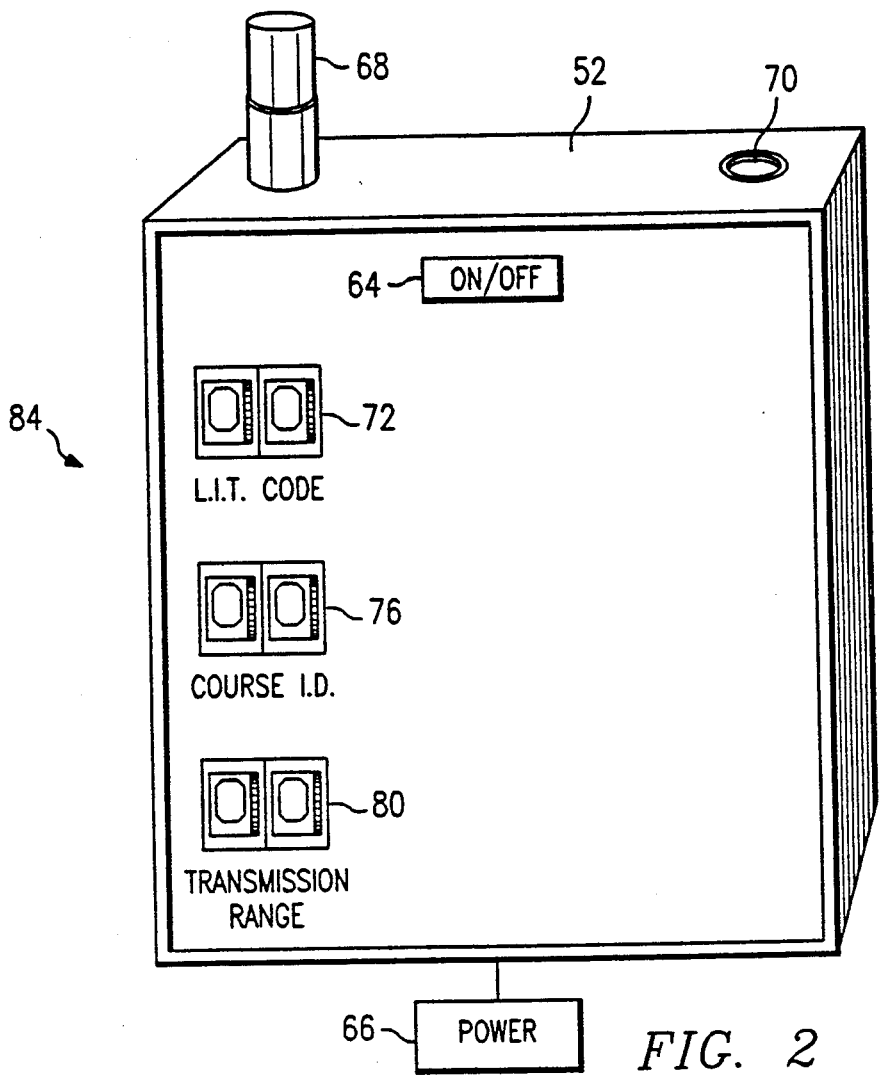
FIG. 2 illustrates a Location Information Transmitter (LIT) of the present invention.

FIG. 2 illustrates a CDT of the present invention such as CDT 52. CDT 52 contains an ON/OFF switch 64, power source 66, antenna 68 and light detector 70. Thumbwheel switches, indicated generally at 84, respectively allow selection of an LIT code 72, which is different for each LIT in the golf course, course identification number 76 and transmission range 80. CDT 52 uses course identification number 76 to select its base transmission frequency, thus allowing simultaneous operation of the system at adjacent golf courses. Antenna 68 is used to transmit signals over specified transmission range 58. CDT 52 transmits a periodic signal containing the hole number or location code of CDT 52. Light detector 70 causes CDT 52 to shut off when it senses light levels which are insufficient for play, thus extending the useful life of power source 66.

Figure 3:
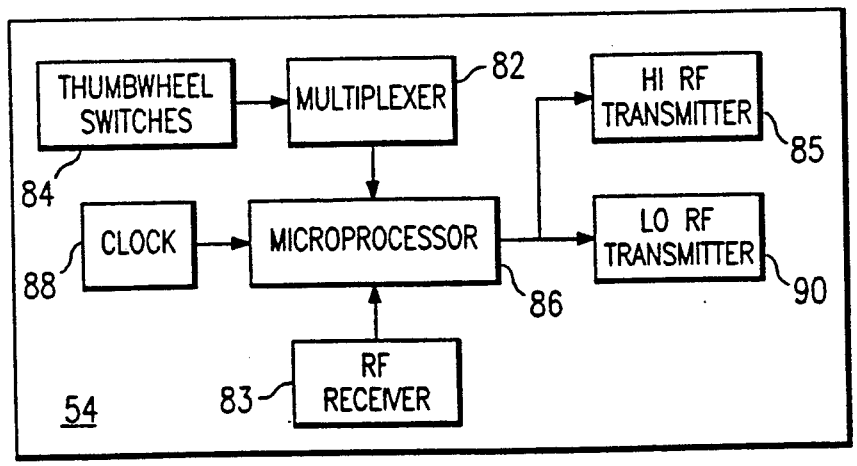
FIG. 3 illustrates a block diagram of the LIT.

FIG. 3 illustrates a block diagram of LIT 54. A multiplexer 82 converts positions of thumbwheel switches 84 into an input for a microprocessor 86. A clock 88 specifies the period of the LIT transmission. At specified time intervals, microprocessor 86 sends data to an RF transmitter 90 for transmission of the location signal. In one embodiment, a receiver 83 is associated with LIT 54 to receive identification signals from METARs 48 and 50, and LIT 54 contains circuitry 85 to provide a high power RF transmission to clubhouse 22. The high power RF transmission contains the METAR identification and the LIT code to enable golf course personnel to monitor golf play.

FIG. 4 illustrates a logic flow diagram of the operation of LIT 54. After power is applied in step 91, an interval time is activated at step 92 to control the wait period between LIT transmissions. When the timer expires in step 94, LIT 54 transmits its specified LIT code in step 96. The interval time is then restarted at step 92 and the cycle repeated.

Figure 5:
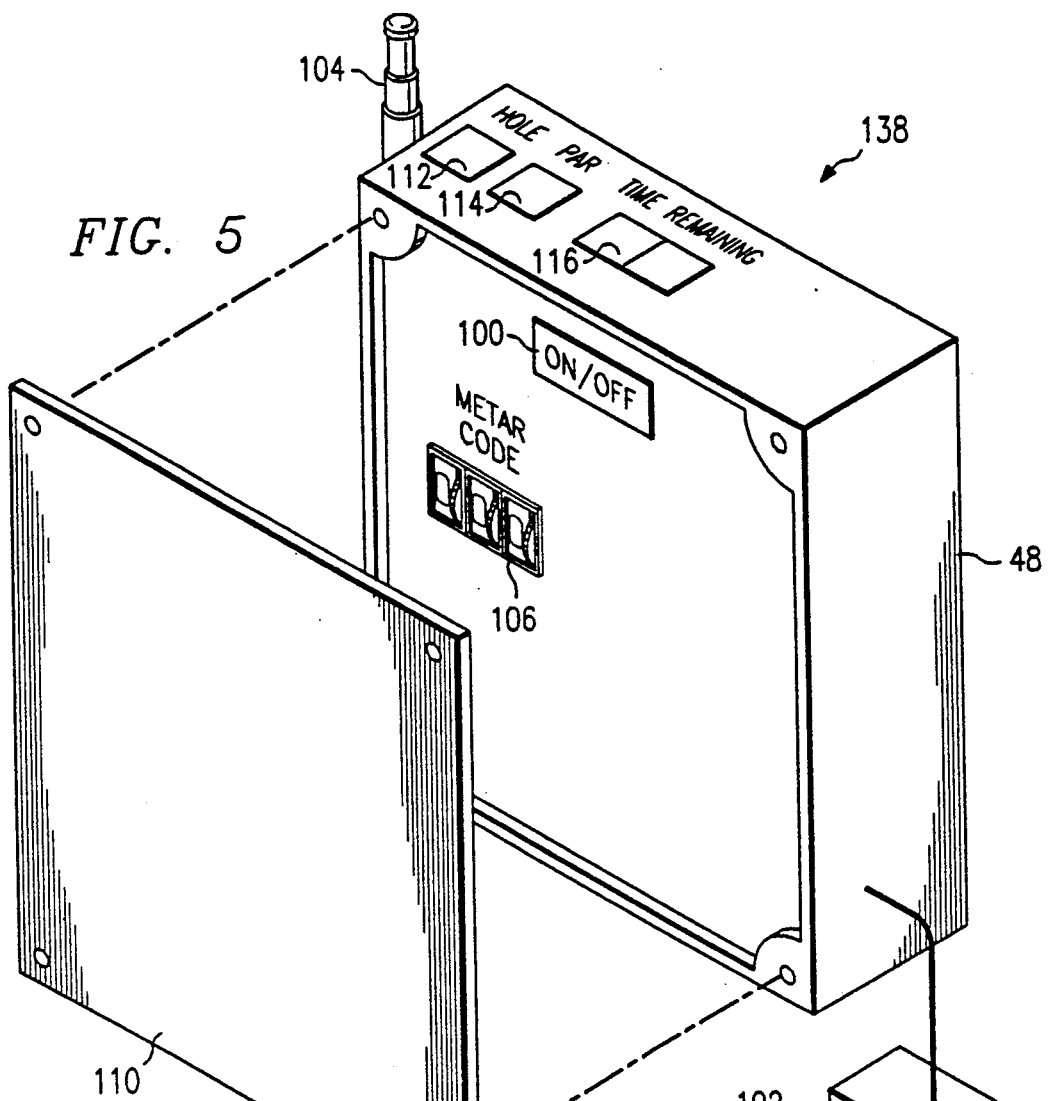
FIG. 5 illustrates a Mobile Electronic Transmitter/Receiver (METAR) of the present invention.

FIG. 5 illustrates a METAR of the present invention, such as METAR 48, having an ON/OFF switch 100, power source 102 and antenna 104. Thumbwheel switches allow selection of a METAR code 106, which is different for each METAR in clubhouse 22. Golf course personnel attach a protective cover 110 to prevent unauthorized modifications to a thumbwheel switches 106. METAR 48 also contains displays, indicated generally at 138, which indicate the golf hole number 112 currently being played, number of par strokes 114 allocated to the golf hole, and time remaining to play the current golf hole 116.

FIG. 6 illustrates a block diagram of METAR 48. A multiplexer 126 converts the positions of thumbwheel switches 106 into an input signal for a microprocessor 130. A clock 132 controls the operation rate of microprocessor 130. An RF receiver 134 receives location signals transmitted from LIT 54 and sends this information to microprocessor 130. Based on the received information, METAR 48 retrieves data from its memory 136 and displays it on display 138. METAR 48 also transmits its identification code from an RF transmitter 140 to LIT 54. In one embodiment, METAR 48 receives course information, such as allotted time for each hole, from the CDT and stores the information in memory 136.

Figure 7:
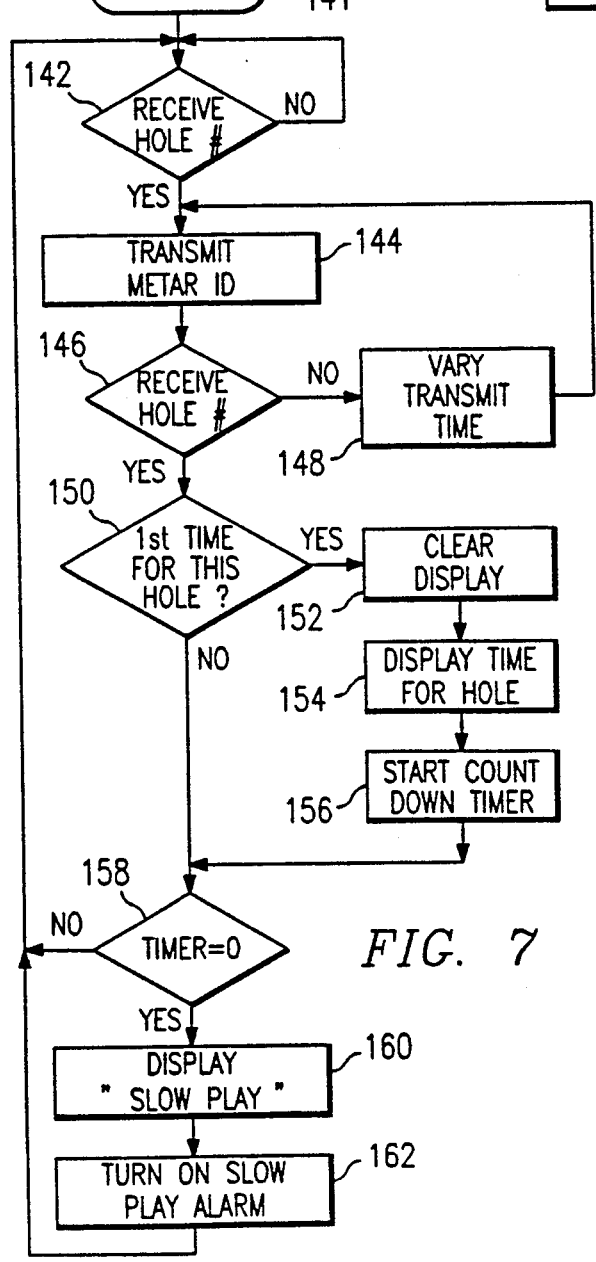
FIG. 7 illustrates a logic flow diagram of the METAR operation.

FIG. 7 illustrates a logic flow diagram of METAR 48 operation. After METAR 48 is initially activated in step 141, microprocessor 130 determines in decision block 142 whether receiver 134 has received a signal from nearby LIT 54. If not, microprocessor 130 loops until such a signal is received. When the LIT signal is received, microprocessor 130 directs RF transmitter 140 to transmit the METAR identification code in step 144. Microprocessor 130 then again determines in decision block 146 whether receiver 134 has received another LIT signal. If not, transmission delay time is changed in step 148 and control returns again to step 144; this loop will continue until microprocessor 130 determines in decision block 146 that receiver 134 has received the LIT signal. If the LIT signal is being received by METAR 48 for the first time, determined in decision block 150, then METAR display 138 is cleared in step 152, microprocessor 130 retrieves from memory 136 information concerning the hole and displays this information in step 154 on display 138. Then, microprocessor 130 begins the countdown time in step 156 and execution continues with decision block 158.

If the signal received by METAR 48 from LIT 54 was not the first, or if it was the first and the countdown time has begun in step 156, then microprocessor 130 determines in decision block 158 whether the time has reached zero. If so, golfer 24 has exceeded the allocated time to play the hole and display 138 indicates to golfer 24 of the slow play condition in step 160 and an audio alarm is activated in step 162. Execution then returns to step 142 and the process is repeated.

If the countdown time has not reached zero in decision block 158, execution returns directly to step 142.

FIG. 8 illustrates an embodiment of the present invention using two LIT's at a single golf tee box area. As the golf cart, indicated generally at 192 and containing a METAR 194, travels along golf cart path 196 associated with green area 198 of a golf hole, indicated generally at 200, METAR 194 enters transmission range 202 of an LIT 204 located at tee box area 206 of adjacent golf hole, indicated generally at 208, even though a golfer 210 assigned to METAR 194 is not utilizing adjacent golf hole 208. This condition results in a false indication of activity by golfer 210 at adjacent golf hole 208.

The false indication of golfer 210 activity is corrected by replacing LIT 204 of adjacent golf hole 208 with a first LIT 212 having a first transmission range 214 and a second LIT 216 having a second transmission range 214 and a second LIT 216 having a second transmission range 218. The two transmission ranges 214 and 218 define a border 220 across the appropriate golf cart path 222 associated with adjacent golf hole 208. The METAR 224 on the golf cart indicated generally at 226 is programmed to trigger upon passage of METAR 224 from second LIT 216 to first LIT 212. It can also be programmed to trigger upon passage from first LIT 212 to second LIT 216. In this manner, METAR 224 detects activity by golfer 211 at adjacent golf hole 208 only when golf cart 226 travels along golf cart path 222 associated with adjacent golf hole 208 and not when golf cart 192 travels along golf cart path 196.

Figure 9:
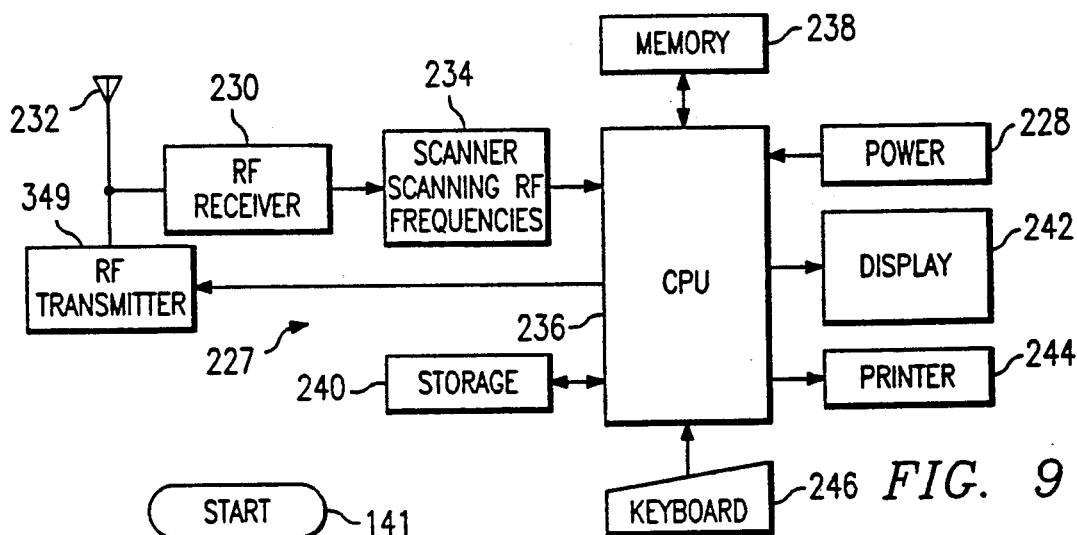
FIG. 9 illustrates a block diagram of a Tracking Center of the present invention.

As previously discussed, in one embodiment of the present invention, each LIT 54 and 56 transmits a high power RF signal to a remote Tracking Center. FIG. 9 illustrates a block diagram of a Tracking Center, indicated generally at 227, normally located in clubhouse 22 of a golf course equipped with the present invention. The Tracking Center 227 has a power source 228. An RF receiver 230 receives radio signals from antenna 232 and outputs these signals to a scanner 234 monitoring various RF frequencies for METAR transmissions. When an LIT transmission is detected, the scanner outputs the received data to a CPU 236. CPU 236 stores and retrieves data in memory 238 and storage device 240. CPU 236 also outputs data to its display terminal 242 and printer 244. The keyboard 246 permits golf course personnel to enter instructions to CPU 236. In the preferred embodiment, CPU 236, memory 238 and storage 240 are contained in a personal computer (PC).

Figure 10:
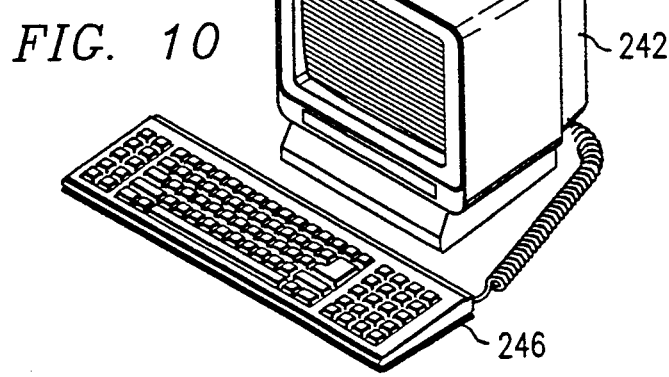
FIG. 10 illustrates a display terminal of the Tracking Center.

FIG. 10 illustrates the Tracking Center's 227 display terminal 242 and keyboard 246.

Figures 11, 14:
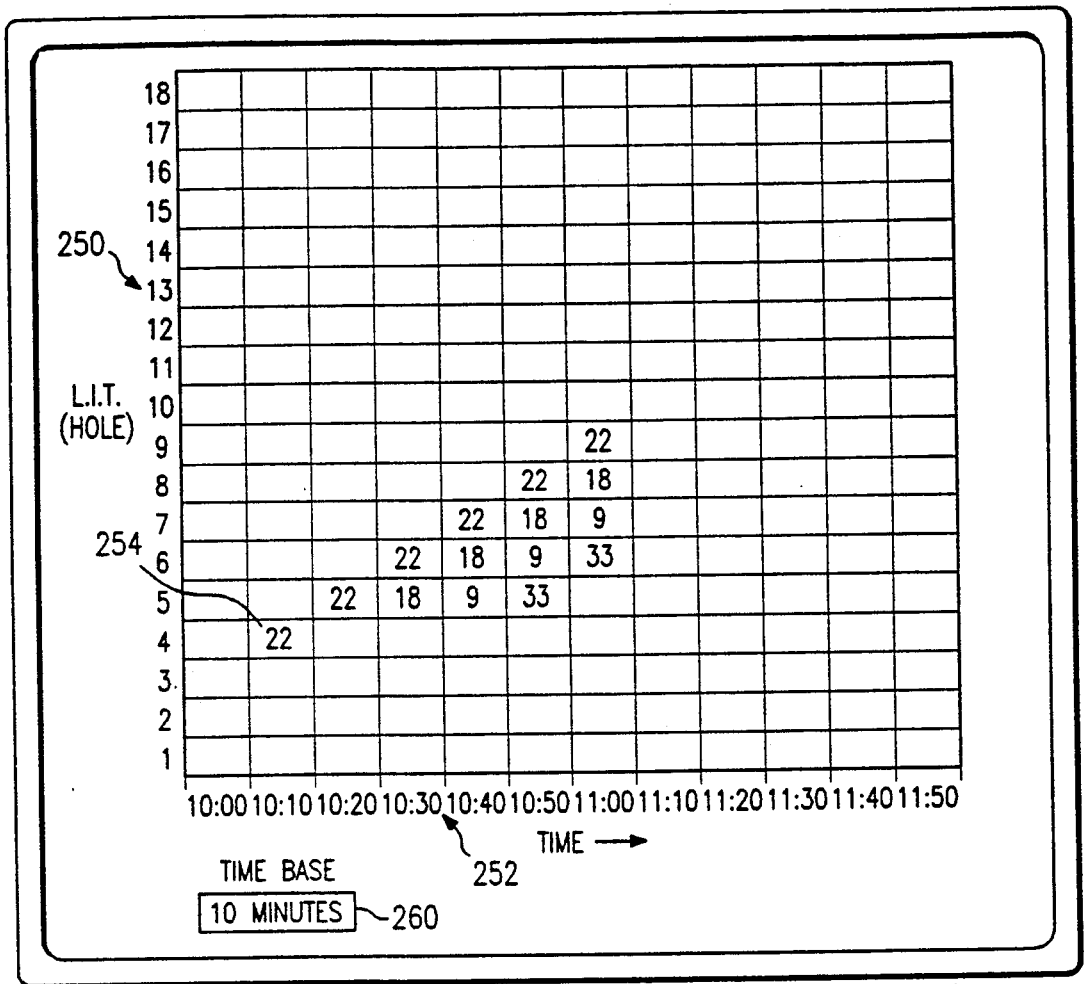
FIG. 11 illustrates a data chart on the display terminal.
FIG. 14 illustrates a report from the Tracking Center.

FIG. 11 illustrates a data chart indicated generally at 248 displayed on display terminal 242. The data chart 248 indicates golf cart utilization, golf hole utilization and golfer activity at the golf course by displaying LIT numbers along one axis, indicated generally at 250, and time along the other axis, indicated generally at 252. The position of a METAR code 254 on data chart 248 is a function of time 252 and location 250 of the corresponding METAR. The time base 260 is specified by golf course personnel to establish the interval between displayed times 252.

Figure 12:
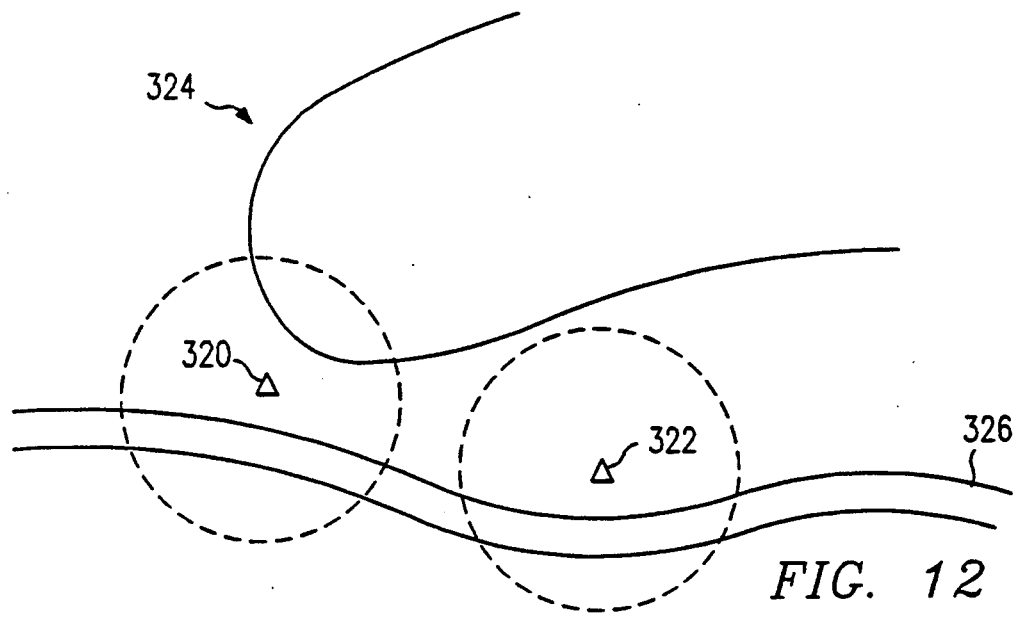
FIG. 12 illustrates an embodiment of the present invention wherein two LITs are used to distinguish between a golfer playing a hole and one who is merely passing by on an adjacent cart path.

FIG. 12 illustrates one embodiment of the present invention wherein two LITs 320 and 322 are located at each golf hole 324 to distinguish between a golfer playing at the hole 324 and one who is merely passing by on an adjacent cart path 326. A time is used in conjunction with a receiver at the golf course to measure the time between the transmissions of first LIT 320 and second LIT 322. If the measured time is less than a predetermined value, it is an indication that the golfer is passing through and his activity at golf hole 324 can be ignored. If, on the other hand, the measured time is greater than the predetermined value, then it indicates that the golfer is actually playing at golf hole 324 and his play will be monitored.

Figure 13:
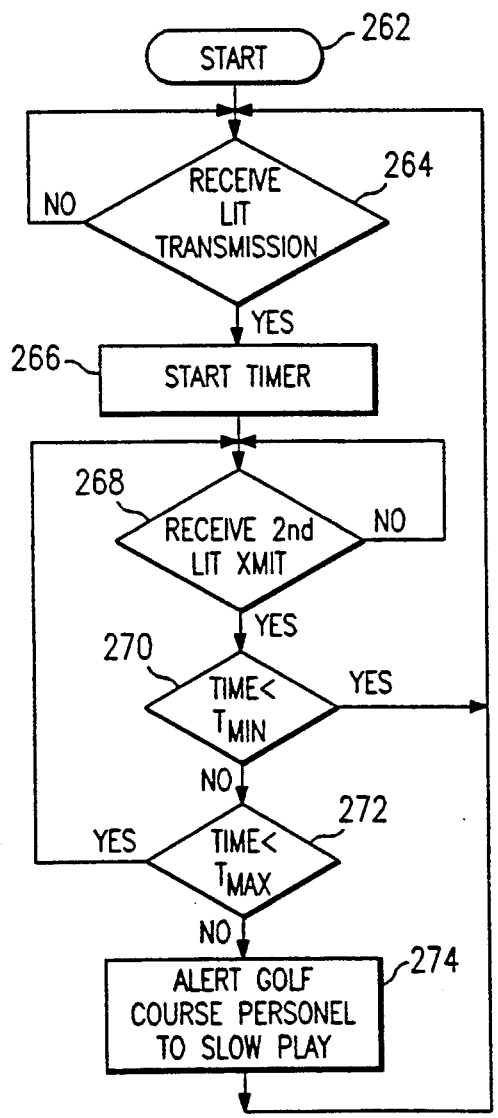
FIG. 13 illustrates a logic flow diagram of the Tracking Center.

FIG. 13 illustrates a logic flow diagram of the Tracking Center 227 operation incorporating the embodiment of the present invention wherein, as discussed in conjunction with FIG. 12, two LITs 320 and 322 are used to distinguish between golfer at golf hole 324 and one who is merely passing by on cart path 326. Execution begins with step 262 and, in decision block 264, the system determines whether a signal has been received from an LIT. If not, execution loops until such a transmission is received. When an LIT transmission is received, a timer is reset and started in step 266. Execution then waits until a transmission has been received, in decision block 268, from second LIT 322. When the transmission has been received, CPU 236 determines in decision block 270 whether the measured time is less than the minimum amount of time required for a golfer who is merely passing on cart path 326 to pass between the two LITs 320 and 322. If so, execution returns to decision block 264 to await another LIT transmission.

If the golfer is not passing through, CPU 236 determines in decision block 272 whether the measured time exceeds the time allotted to the golfer at golf hole 324. If the maximum time has not been exceeded, then execution returns to decision block 268. If the maximum amount of time has been exceeded, the CPU 236 alerts golf course personnel of the slow play on golf hole 324.

Data chart 248 automatically shifts the contents of the screen to the left at appropriate intervals in order that the information displayed remains current. Data chart 248 also dynamically indicates the status and location of golf carts and golfers throughout the golf course. In FIG. 11, for example, the golfer utilizing METAR 22 has created a slow play condition during the time interval from 10:10 to 10:19 on hole number 4. This same golfer also played slowly between 10:20 and 10:29 on hole number 5, thus causing a second golfer utilizing METAR 18 to slow play at number 5 between 10:30 and 10:39. The initial slow play condition ultimately compounded itself by causing golfers using METARs 9 and 33 to also slow play.

All information displayed on the data chart is stored by the Tracking Center 227 for retrieval at a later time. This feature enables golf course personnel to document and prove slow play of a particular golfer and to study the utilization of golf carts and golf holes within the golf course.

FIG. 14 illustrates a report of slow play data. Each row of the report contains METAR number 278, the golf hole where slow play occurred 280, the par value assigned to the particular golf hole 282, the ideal time for playing golf hole 284, and the actual playing time taken of golfer 286.

FIGS. 15a-b illustrate another exemplary embodiment of the operation of METAR 48 and LIT 54. Referring to FIG. 1 and FIG. 15a, METAR 48 is carried in association with golf cart 28 and golfer 24. METAR 48 periodically transmits an identification signal within a specified low power RF transmission range indicated by dotted circle 300 of FIG. 15a. The identification signal includes the METAR code selected by thumbwheel switches 106 of FIG. 5 and FIG. 6. METAR 48 transmits the identification signal with RF transmitter 140 of FIG. 6. LIT 54 is proximate to golf hole 10 of FIG. 1 and is able to receive the identification signal transmitted by METAR 48 in response to METAR 48 being proximate to LIT 54. LIT 54 receives the identification signal with RF receiver 83 of FIG. 3.

In FIG. 15a, METAR 48 is not proximate to LIT 54, as indicated by LIT 54 being outside transmission range 300 of the identification signal transmitted by METAR 48. Consequently, LIT 54 fails to receive the identification signal transmitted by METAR 48. In FIG. 15b, METAR 48 is proximate to LIT 54, as indicated by LIT 54 being within transmission range 300 of the identification signal transmitted by METAR 48. Consequently, LIT 54 receives the identification signal transmitted by METAR 48. Accordingly, the proximity of golfer 24 to golf hole 10 is indicated by LIT 54 receiving the identification signal transmitted by METAR 48.

In response to whether LIT 54 receives the identification signal from METAR 48 more than a specified number of times during a time period, LIT 54 transmits a play monitoring signal indicating whether golfer 24 is proximate to golf hole 10. LIT 54 transmits the play monitoring signal with high power RF transmitter 85 of FIG. 3. The specified number of times may be zero times, so that the play monitoring signal transmitted by LIT 54 indicates that golfer 24 is proximate to golf hole 10 in response to LIT 54 receiving the identification signal from METAR 48 at least one time during the time period.

The play monitoring signal transmitted by LIT 54 includes the LIT code 72 selected by thumbwheel switches 84 of FIG. 2 and FIG. 3. The play monitoring signal further includes the METAR code for each METAR, such as METAR 48, from which LIT 54 receives an identification signal during the time period, together with the number of times that LIT 54 receives each such METAR's identification signal during the time period. For example, if LIT 54 receives identification signals from a first METAR and from a second METAR during the time period, then LIT 54 transmits a play monitoring signal that separately specifies the number of times LIT 54 received an identification signal from the first METAR and the number of times LIT 54 received an identification signal from the second METAR.

In an alternative embodiment, the play monitoring signal does not specify the number of times that LIT 54 receives each such METAR's identification signal during the time period, but instead the play monitoring signal includes the METAR codes only for those METARs from which LIT 54 receives an identification signal more than a specified number of times during the time period. For example, if the specified number of times is three times, and if LIT 54 receives an identification signal four times during the time period from a first METAR and an identification signal three times during the time period from a second METAR, then LIT 54 transmits a play monitoring signal that includes the METAR code only for the first METAR.

Referring to FIG. 9, Tracking Center 227 receives play monitoring signals with RF receiver 230 from LIT 54 and other LITS. Based upon the play monitoring signals received from the LITS, CPU 236 of Tracking Center 227 determines a length of time for a golfer to play a golf hole, such as for golfer 24 of FIG. 1 to play golf hole 10. CPU 236 of Tracking Center 227 compares the determined length of time against a predetermined time to enable the determination of whether the golfer played the golf hole within the predetermined time. If the golfer fails to play the golf hole within the predetermined time, then Tracking Center 227 indicates a slow play condition on display terminal 242.

FIG. 16 illustrates a logic flow diagram of the METAR 48 operation according to the approach of FIGS. 15a-b. Under the approach of FIG. 16, METAR 48 periodically transmits its identification signal. Execution begins at step 310. METAR 48 then starts an interval timer at step 312. Decision block 314 determines whether the interval timer has expired. If not, then execution loops at decision block 314 until the interval timer expires, thereby indicating a time for METAR 48 to transmit its identification signal. At that time, at step 316, METAR 48 transmits its identification signal including its METAR code. Execution then returns to step 312.

FIG. 17 illustrates a first exemplary logic flow diagram of the LIT 54 operation according to the approach of FIGS. 15a-b. Execution begins at step 320, and decision block 322 determines whether LIT 54 has received an indication signal including a METAR code. If not, then execution loops at decision block 322 until LIT 54 receives a METAR code. After LIT 54 receives a METAR code, LIT 54 transmits a play monitoring signal at step 324. Execution then returns to decision block 322. Under the approach of FIG. 17, multiple LITs might simultaneously transmit play monitoring signals, possibly causing radio frequency interference that could interfere with an ability of Tracking Center 227 to accurately receive the play monitoring signals.

This possibility is addressed by the approach of FIG. 18, which illustrates a second exemplary logic flow diagram of the LIT 54 operation according to the approach of FIGS. 15a-b. In accordance with the approach of FIG. 18, simultaneous transmissions of play monitoring signals from multiple LITs can be avoided by appropriately coordinating the times when each LIT transmits a play monitoring signal. Under the approach of FIG. 18, microprocessor 86 (FIG. 3) of LIT 54 separately maintains one or more counters each associated with a different METAR. In this manner, LIT 54 separately records a number of times that LIT 54 receives an identification signal from each of several METARs during a time period between successive transmissions by LIT 54 of a play monitoring signal. Based upon the number of times recorded by each counter, LIT 54 transmits a play monitoring signal specifying the number of times that LIT 54 receives each METAR's identification signal during the time period.

Alternatively, LIT 54 can transmit a play monitoring signal including the METAR codes only for those METARs from which LIT 54 receives an identification signal more than a specified number of times during the time period, based upon the number of times recorded by each counter.

In FIG. 18, execution begins at step 330. At step 332, LIT 54 resets the counts in each of its counters. Decision block 334 determines whether LIT 54 has received an identification signal. If not, then decision block 336 determines whether LIT 54 has transmitted a play monitoring signal since the last time LIT 54 reset the counts in each of its counters at step 332. If LIT 54 has not transmitted such a play monitoring signal, then execution loops back to decision block 334.

If decision block 334 determines that LIT 54 has received an identification signal from a METAR, then at step 338 LIT 54 increments a count in a counter associated with the METAR from which the identification signal is received. Execution then loops back to decision block 334. If decision block 336 determines that LIT 54 has transmitted a play monitoring signal since the last time LIT 54 reset the counts in each of its counters at step 332, then execution returns to step 332 where LIT 54 again resets the counts in each of its counters.

Figure 19:
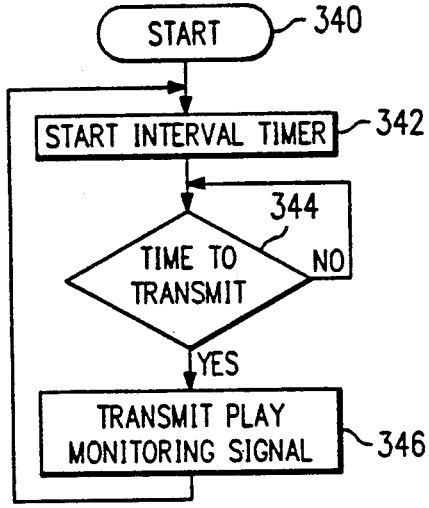
FIG. 19 illustrates a first exemplary logic flow diagram of the LIT operation according to the approach of FIG. 18.

The times when multiple LITs transmit play monitoring signals can be appropriately coordinated according to one of several approaches discussed further hereinbelow in connection with FIGS. 19, 20a, 21a and 23a, in order to avoid simultaneous transmissions of play monitoring signals from multiple LITS. FIG. 19 illustrates a first exemplary logic flow diagram of the LIT 54 operation according to the approach of FIG. 18. Execution begins at step 340. At step 342, LIT 54 starts an interval timer. Decision block 344 determines whether the interval timer has expired. If not, then execution loops at decision block 344 until the interval timer expires, thereby indicating a time for LIT 54 to transmit a play monitoring signal. At that time, at step 346, LIT 54 transmits a play monitoring signal, and an appropriate indication is provided to decision block 336 of FIG. 18. Under the approach of FIG. 19, simultaneous transmissions of play monitoring signals from multiple LITs can be avoided by appropriately coordinating the times when each LIT starts its interval timer at step 342. A shortcoming of the approach of FIG. 19 is the difficulty of appropriately coordinating the times when each LIT starts its interval timer. For example, even if the interval timers of multiple LITs are appropriately coordinated at a particular moment, slight differences in accuracy between the interval timers can eventually disrupt the coordinated transmission of play monitoring signals.

Figure 20B:
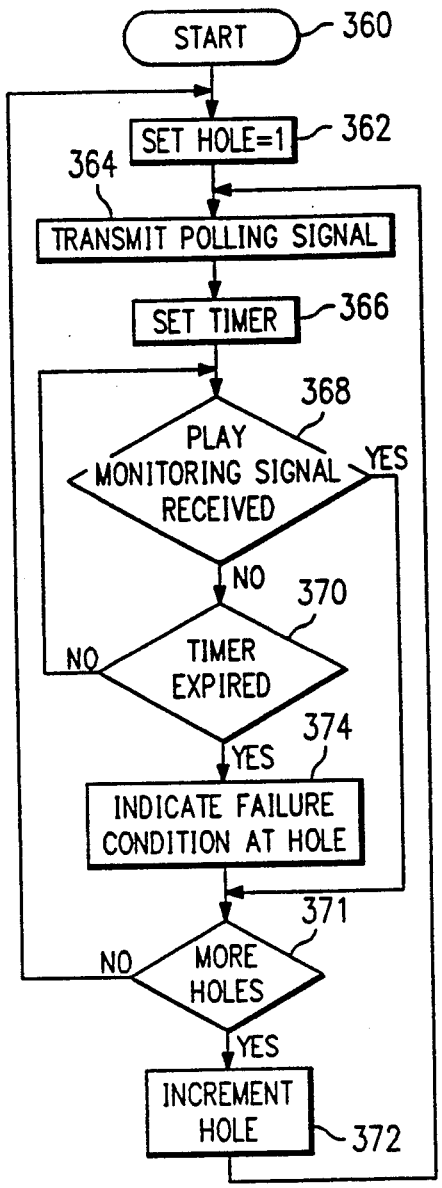
Figure 20A:
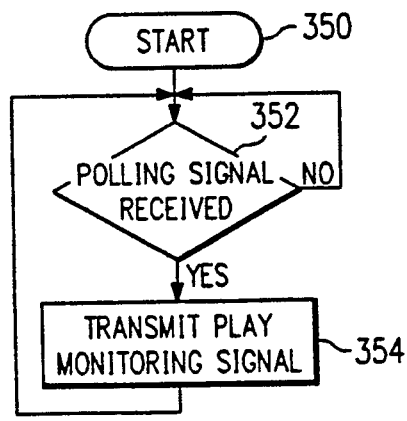
FIG. 20a illustrates a second exemplary logic flow diagram of the LIT operation according to the approach of FIG. 18.

FIG. 20a illustrates a second exemplary logic flow diagram of the LIT 54 operation according to the approach of FIG. 18. Under the approach of FIG. 20a, Tracking Center 227 transmits a unique polling signal with RF transmitter 349 (FIG. 9) to each LIT, so that each LIT transmits a play monitoring signal in response to receiving its unique polling signal from Tracking Center 227. Advantageously, by using unique polling signals from a central source, such as Tracking Center 227, a coordinated transmission of play monitoring signals from multiple LITs can be easily achieved so that only one LIT transmits a play monitoring signal at any given moment.

Accordingly, in FIG. 20a, execution begins at step 350. Decision block 352 determines whether LIT 54 has received its unique polling signal with RF receiver 83 (FIG. 3) from Tracking Center 227. If not, then execution loops at decision block 352 until LIT 54 receives its unique polling signal. Then, at step 354, LIT 54 transmits a play monitoring signal, and an appropriate indication is provided to decision block 336 of FIG. 18. Execution then returns to decision block 352.

FIG. 20b illustrates a logic flow diagram of the Tracking Center 227 operation according to the approach of FIG. 20a. Execution begins at step 360. At step 362, Tracking Center 227 sets a present golf hole at golf hole number 1. At step 364, Tracking Center 227 transmits a unique polling signal to a LIT proximate to the present golf hole. At step 366, Tracking Center 227 sets a timer in order to monitor whether the LIT transmits a play monitoring signal in response to the unique polling signal within a specified time. Accordingly, decision block 368 determines whether Tracking Center 227 has received the play monitoring signal. If not, then decision block 370 determines whether the timer has expired. If the timer has not expired, then execution loops back to decision block 368.

If decision block 368 determines that Tracking Center 227 has received the play monitoring signal, then decision block 371 determines whether any golf hole remains to be polled. If not, then execution returns to step 362. If decision block 371 determines that one or more golf holes remain to be polled, then at step 372 Tracking Center 227 increments the number of the present golf hole, and execution returns to step 364. if decision block 370 determines that the timer has expired, then at step 374 Tracking Center 227 indicates a failure condition at the present golf hole, and execution continues to decision block 371.

Instead of transmitting a unique polling signal to each LIT, Tracking Center 227 alternatively can transmit a universal polling signal in order to achieve a coordinated transmission of play monitoring signals from multiple LITS. To avoid simultaneous transmission of play monitoring signals from multiple LITS, each LIT begins transmission of a play monitoring signal at a specified time after it receives the universal polling signal, where the specified time varies according to each LIT.

Figure 21A:
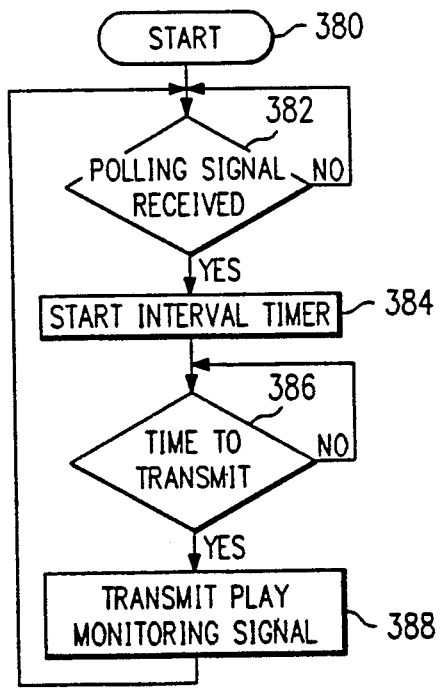
FIG. 21a illustrates a third exemplary logic flow diagram of the LIT operation according to the approach of FIG. 18.

FIG. 21a illustrates a third exemplary logic flow diagram of the LIT 54 operation according to the approach of FIG. 18. Under the approach of FIG. 21a, LIT 54 responds to such a universal polling signal. Execution begins at step 380, and decision block 382 determines whether LIT 54 has received the universal polling signal. If not, then execution loops at decision block 382 until LIT 54 receives the universal polling signal. After LIT 54 receives the universal polling signal, LIT 54 starts an interval timer at step 384, and decision block 386 determines whether the interval timer has expired. If not, then execution loops at decision block 386 until the interval timer expires, thereby indicating a time for LIT 54 to transmit a play monitoring signal. At that time, at step 388, LIT 54 transmits a play monitoring signal, and an appropriate indication is provided to decision block 336 at FIG. 18. Execution then returns to decision block 382.

Figure 21B:
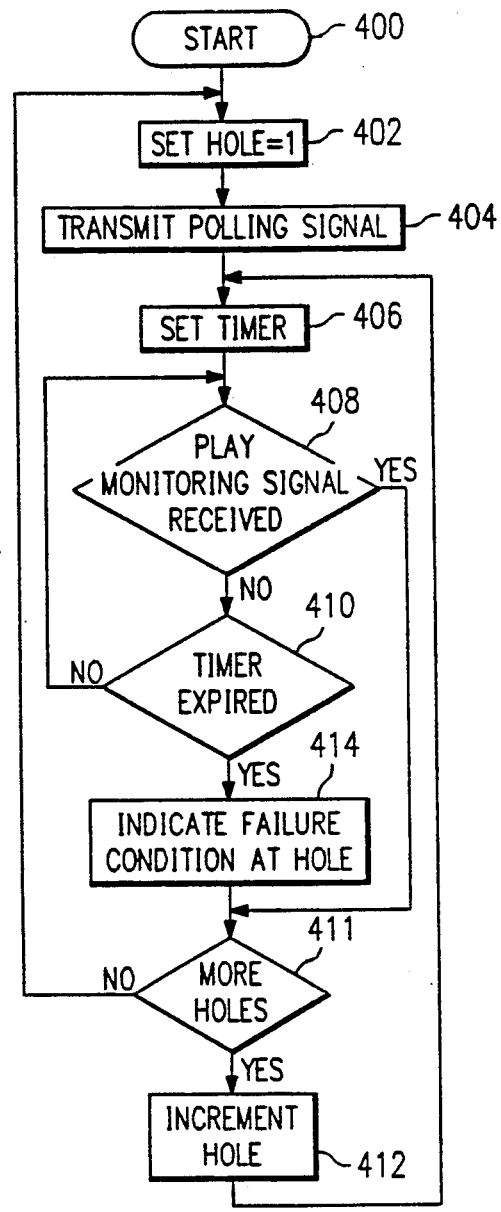

FIG. 21b illustrates a logic flow diagram of the Tracking Center 227 operation according to the approach of FIG. 21a. Execution begins at step 400. At step 402, Tracking Center 227 sets a present golf hole at golf hole number 1. At step 404, Tracking Center 227 transmits a universal polling signal. At step 406, Tracking Center 227 sets a timer in order to monitor whether a LIT proximate to the present golf hole transmits a play monitoring signal in response to the universal polling signal within a specified time. Accordingly, decision block 408 determines whether Tracking Center 227 has received the play monitoring signal. If not, then decision block 410 determines whether the timer has expired. If the timer has not expired, then execution loops back to decision block 408.

If decision block 408 determines that Tracking Center 227 has received the play monitoring signal, then decision block 411 determines whether any golf hole remains from which a play monitoring signal is to be received. If not, then execution returns to step 402. If decision block 411 determines that one or more golf holes remain from which a play monitoring signal is to be received, then at step 412 Tracking Center 227 increments the number of the present golf hole, and execution returns to step 406. If decision block 410 determines that the timer has expired, then at step 414 Tracking Center 227 indicates a failure condition at the present golf hole, and execution continues to decision block 411.

In another exemplary embodiment, Tracking Center 227 and each LIT transmit a data packet according to a token ring communication arrangement. Referring to FIG. 1 and FIG. 9, under such a token ring communication arrangement Tracking Center 227 transmits a data packet with RF transmitter 349 from clubhouse 22 to LIT 54 proximate to golf hole 10. In response to LIT 54 receiving the data packet with RF receiver 83 (FIG. 3), microprocessor 86 of LIT 54 modifies the data packet to include a play monitoring signal for golf hole 10 and to further include an address of a next sequential receiver, such as an RF receiver of LIT 56 proximate to golf hole 14 or such as RF receiver 230 of Tracking Center 227. LIT 54 then transmits the data packet with high power RF transmitter 85 (FIG. 3), and the next sequential receiver receives the data packet. If the next sequential receiver is an RF receiver of LIT 56, then LIT 56 receives the data packet and modifies the data packet to include a play monitoring signal for golf hole 14 and to further include an address of a next sequential receiver. LIT 56 then transmits the data packet.

Figure 22:
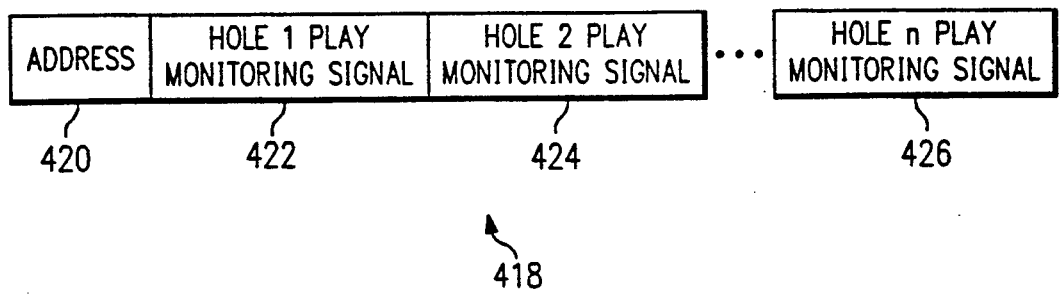
FIG. 22 illustrates a data packet of a token ring communication arrangement.

FIG. 22 illustrates a data packet 418 of such a token ring communication arrangement. Address field 420 specifies an address of a next sequential receiver. A first LIT, such as LIT 54 proximate to golf hole 10, modifies data packet 418 to include a play monitoring signal for a first golf hole in data field 422. A second LIT, such as LIT 56 proximate to golf hole 14, modifies data packet 418 to include a play monitoring signal for a second golf hole in data field 424. Eventually, a final LIT of the sequence of LITs modifies data packet 418 to include a play monitoring signal for a final golf hole in data field 426. The final LIT also modifies address field 420 of data packet 418 to include the address of RF receiver 230 of Tracking Center 227 within clubhouse 22. After the final LIT transmits data packet 418, RF receiver 230 of Tracking Center 227 receives data packet 418, and CPU 236 of Tracking Center 227 reads the play monitoring signals from data fields 422 through 426. In this manner, data packet 418 is initially transmitted by Tracking Center 227, modified by a sequence of LITs respectively proximate to a sequence of golf holes, and then received by Tracking Center 227 to complete the token ring communication arrangement.

Figure 23A:
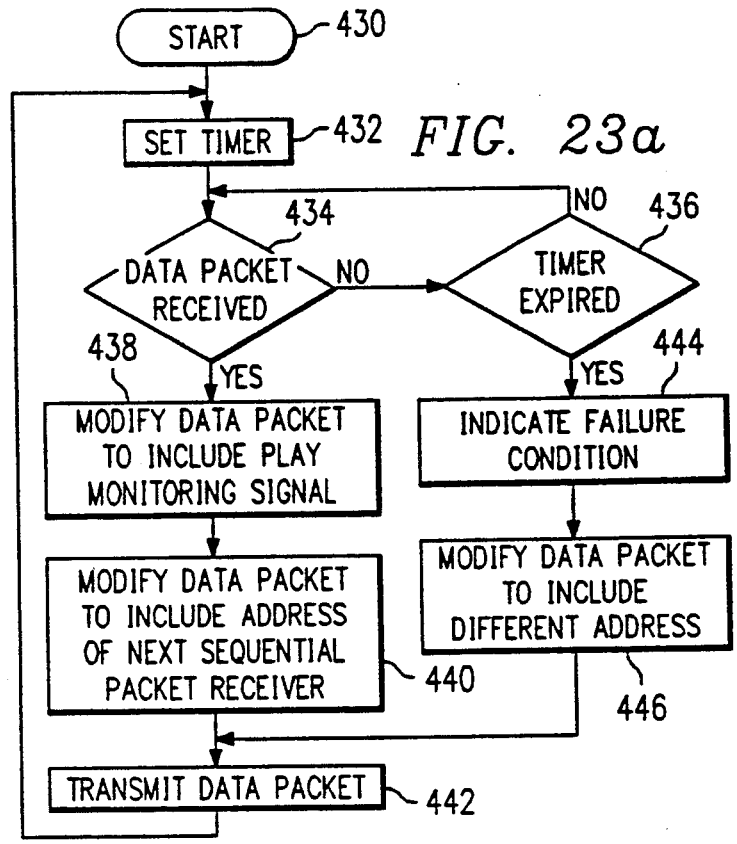
FIG. 23a illustrates a fourth exemplary logic flow diagram of the LIT operation according to the approach of FIG. 18 using the token ring communication arrangement.

FIG. 23a illustrates a fourth exemplary logic flow diagram of the LIT 54 operation according to the approach of FIG. 18 using the token ring communication arrangement. Execution begins at step 430. At step 432, LIT 54 sets a timer in order to monitor whether LIT 54 receives the data packet within a specified time. Accordingly, decision block 434 determines whether LIT 54 has received the data packet. If not, then decision block 436 determines whether the timer has expired. If the timer has not expired, then execution loops back to decision block 434. When decision block 434 determines that LIT 54 has received the data packet, LIT 54 modifies the data packet at step 438 to include a play monitoring signal for golf hole 10. At step 440, LIT 54 further modifies the data packet to include an address of a next sequential receiver. At step 442, LIT 54 transmits the data packet, and an appropriate indication is provided to decision block 336 of FIG. 18. Execution then returns to step 432.

If decision block 436 determines that the timer has expired, then at step 444 LIT 54 indicates a failure condition. After indicating such a failure condition, at step 446 LIT 54 retrieves from its memory a most recent version of the data packet, and LIT 54 modifies the retrieved most recent version of the data packet to include an address different from the address previously included in the data packet at step 440. By modifying the data packet to include a different address, LIT 54 modifies the sequence of receivers that receive the data packet, thereby attempting to bypass the source of the failure condition. After step 446, execution continues to step 442.

Figure 23B:
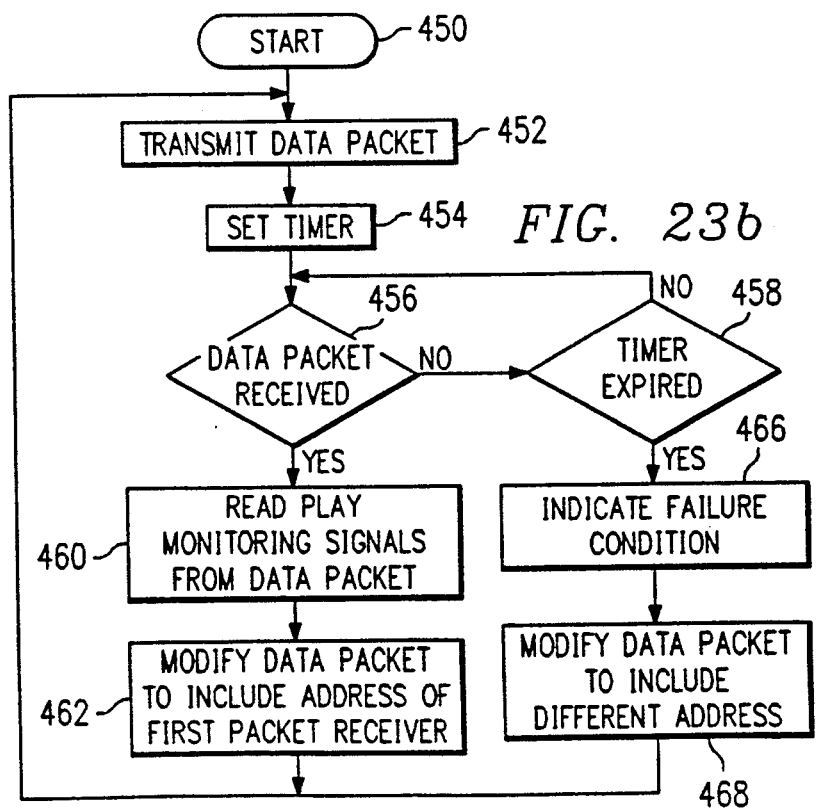

FIG. 23b illustrates a logic flow diagram of the Tracking Center 227 operation according to the approach of FIG. 23a. Execution begins at step 450. At step 452, Tracking Center 227 transmits an initialized version of the data packet that includes the address of a first receiver of a first LIT proximate to a first golf hole. At step 454, Tracking Center 227 sets a timer in order to monitor whether Tracking Center 227 receives the data packet within a specified time. Accordingly, decision block 456 determines whether Tracking Center 227 has received the data packet. If not, then decision block 458 determines whether the timer has expired. If the timer has not expired, then execution loops back to decision block 456.

After decision block 456 determines that Tracking Center 227 has received the data packet, Tracking Center 227 reads the play monitoring signals from the data packet at step 460. At step 462, Tracking Center 227 modifies the data packet to include the address of the first receiver as in step 452. After step 462, execution returns to step 452.

If decision block 458 determines that the timer has expired, then at step 466 Tracking Center 227 indicates a failure condition. After indicating such a failure condition, at step 468 Tracking Center 227 modifies the initialized version of the data packet to include an address different from the address previously included in the data packet at step 452. By modifying the data packet to include a different address, Tracking Center 227 modifies the sequence of receivers that receive the data packet, thereby attempting to bypass the source of the failure condition. After step 468, execution returns to step 452.

Although the present invention and its advantages have been described in detail, it should be understood that various changes, substitutions and alterations can be made herein without departing from the spirit and scope of the invention as defined by the appended claims.

What is claimed is:

1. A system for monitoring a golfer's play within a golf course, comprising:
   a mobile transmitter carried in association with the golfer for transmitting an identification signal associated therewith;
   a plurality of location receivers each proximate to a corresponding golf hole within said golf course and each operable to receive said identification signal in response to the golfer being proximate to said corresponding golf hole;
   a plurality of location transmitters each operable to transmit a play monitoring signal in response to a polling signal, said play monitoring signal indicating whether the golfer is proximate to said corresponding golf hole during a time period in response to a number of times an associated one of said location receivers receives said identification signal during said time period; and
   means for determining whether the golfer plays one of said corresponding golf holes within a predetermined length of time in response to said play monitoring signals transmitted from said location transmitters.

2. The system of claim 1 wherein said determining means comprises:
   means for determining a length of time for the golfer to play one of said corresponding golf holes in response to said play monitoring signals transmitted from said location transmitters; and
   means for comparing a predetermined time against said length of time for the golfer to play in order to enable the determination of whether the golfer played the golf hole within the predetermined time.

3. The system of claim 1 wherein said location transmitters are each operable to transmit said play monitoring signal indicating that the golfer is proximate to said corresponding golf hole in response to said associated location receiver receiving said identification signal more than a specified number of times during said time period.

4. The system of claim 1 wherein said location transmitters are each operable to transmit said play monitoring signal indicating that the golfer is not proximate to said corresponding golf hole in response to said associated location receiver failing to receive said identification signal more than a specified number of times during said time period.

5. The system of claim 4 wherein said specified number of times is zero.

6. The system of claim 1 and further comprising:
   a monitoring transmitter for transmitting said polling signal; and
   a plurality of polling receivers each for receiving said polling signal so that an associated one of said location transmitters transmits said play monitoring signal in response to said polling signal.

7. The system of claim 6 wherein each said associated location transmitter begins transmitting said play monitoring signal at a specified time after said polling signal is received.

8. The system of claim 7 wherein said specified time varies according to each said associated location transmitter.

9. The system of claim 1 and further comprising:
   a monitoring transmitter for transmitting a plurality of polling signals; and
   a plurality of polling receivers each for receiving an associated one of said polling signals so that an associated one of said location transmitters transmits said play monitoring signal in response to said associated polling signal.

10. The system of claim 9 wherein said monitoring transmitter is operable to transmit each said associated polling signal at a different time within a specified period of time.

11. The system of claim 1 and further comprising means responsive to said determining means for indicating a slow play occurrence in response to the golfer failing to play the golf hole within the predetermined time.

12. The system of claim 1 and further comprising means for displaying which of said corresponding golf holes the golfer is playing in response to said play monitoring signals.

13. A system for monitoring a golfer's play within a golf course, comprising:

a mobile transmitter carried in association with the golfer for transmitting an identification signal associated therewith;

a plurality of location receivers each proximate to a corresponding golf hole within said golf course and each operable to receive said identification signal in response to the golfer being proximate to said corresponding golf hole;

a plurality of location transmitters operable to transmit a data packet;

a plurality of packet receivers operable to receive said data packet;

a plurality of modifying means each for modifying said data packet in response to an associated one of said packet receivers receiving said data packet such that said data packet transmitted from an associated one of said location transmitters comprises a play monitoring signal, said play monitoring signal indicating whether the golfer is proximate to said corresponding golf hole during a time period in response to a number of times an associated one of said location receivers receives said identification signal during said time period; and means for determining whether the golfer plays one of said corresponding golf holes within a predetermined length of time in response to said play monitoring signals in said data packet.

14. The system of claim 13 wherein said determining means comprises:
means for determining a length of time for the golfer to play one of said corresponding golf holes in response to said play monitoring signals in said data packet; and
means for comparing a predetermined time against said length of time for the golfer to play in order to enable the determination of whether the golfer played the golf hole within the predetermined time.

15. The system of claim 13 wherein said plurality of modifying means are each operable to modify said data packet in response to said associated packet receiver receiving said data packet such that said data packet transmitted from said associated location transmitter comprises an address of a next sequential one of said packet receivers, so that said data packet is received by said next sequential packet receiver.

16. The system of claim 15 wherein, in response to each said address of said next sequential packet receiver included in said data packet, said data packet is received by a sequence of said packet receivers.

17. The system of claim 16 wherein said plurality of modifying means are each operable to modify said data packet in response to said associated packet receiver indicating a failure condition such that said data packet transmitted from said associated location transmitter comprises a different address, so that said sequence of said packet receivers is modified.

18. The system of claim 17 wherein each said associated packet receiver is operable to indicate said failure condition in response to said associated packet receiver failing to receive said data packet within a predetermined time after said data packet is transmitted from said associated location transmitter.

19. The system of claim 16 wherein a selected one of said sequence of packet receivers is coupled to said determining means, and wherein said determining means is operable to determine whether the golfer plays one of said corresponding golf holes within said predetermined length of time in response to said play monitoring signals in said data packet received by said selected packet receiver.

20. The system of claim 13 wherein each said packet receiver is physically associated with a respective one of said location receivers.

21. A method of monitoring a golfer's play within a golf course, comprising the steps of:
transmitting an identification signal associated with a mobile transmitter carried in association with the golfer;
receiving said identification signal with each of a plurality of location receivers each proximate to a corresponding golf hole within said golf course and each in response to the golfer being proximate to said corresponding golf hole;
transmitting from each of a plurality of location transmitters a play monitoring signal in response to a polling signal, said play monitoring signal indicating whether the golfer is proximate to said corresponding golf hole during a time period in response to a number of times an associated one of said location receivers receives said identification signal during said time period; and
determining whether the golfer plays one of said corresponding golf holes within a predetermined length of time in response to said play monitoring signals transmitted from said location transmitters.

22. The method of claim 21 wherein said determining step comprises the steps of:
determining a length of time for the golfer to play one of said corresponding golf holes in response to said play monitoring signals transmitted from said location transmitters; and
comparing a predetermined time against said length of time for the golfer to play in order to enable the determination of whether the golfer played the golf hole within the predetermined time.

23. The method of claim 21 wherein said play monitoring signal transmitting step comprises the step of transmitting from at least one of said location transmitters said play monitoring signal indicating that the golfer is proximate to said corresponding golf hole in response to said associated location receiver receiving said identification signal more than a specified number of times during said time period.

24. The method of claim 21 wherein said play monitoring signal transmitting step comprises the step of transmitting from at least one of said location transmitters said play monitoring signal indicating that the golfer is not proximate to said corresponding golf hole in response to said associated location receiver failing to receive said identification signal more than a specified number of times during said time period.

25. The method of claim 24 wherein said specified number of times is zero.

26. The method of claim 21 and further comprising the steps of:
transmitting said polling signal from a monitoring transmitter; and
receiving said polling signal with a plurality of polling receivers each so that an associated one of said location transmitters transmits said play monitoring signal in response to said polling signal.

27. The method of claim 26 wherein said play monitoring signal transmitting step comprises the step of beginning transmission of said play monitoring signal at a specified time after said polling signal is received.

28. The method of claim 27 wherein said specified time varies according to each said associated location transmitter.

29. The method of claim 21 and further comprising the steps of:
   transmitting a plurality of polling signals from a monitoring transmitter; and
   receiving an associated one of said polling signals with at least one of a plurality of polling receivers so that an associated one of said location transmitters transmits said play monitoring signal in response to said associated polling signal.

30. The method of claim 29 wherein said polling signals transmitting step comprises the step of transmitting each said associated polling signal at a different time within a specified period of time.

31. The method of claim 21 and further comprising the step of indicating a slow play occurrence in response to the golfer failing to play the golf hole within the predetermined time.

32. The method of claim 21 and further comprising the step of displaying which of said corresponding golf holes the golfer is playing in response to said play monitoring signals.

33. A method of monitoring a golfer's play within a golf course, comprising the steps of:
   transmitting an identification signal associated with a mobile transmitter carried in association with the golfer;
   receiving said identification signal with each of a plurality of location receivers each proximate to a corresponding golf hole within said golf course and each in response to the golfer being proximate to said corresponding golf hole;
   transmitting a data packet from each of a plurality of location transmitters;
   receiving said data packet with each of a plurality of packet receivers;
   modifying said data packet in response to an associated one of said packet receivers receiving said data packet such that said data packet transmitted from an associated one of said location transmitters comprises a play monitoring signal, said play monitoring signal indicating whether the golfer is proximate to said corresponding golf hole during a time period in response to a number of times an associated one of said location receivers receives said identification signal during said time period; and
   determining whether the golfer plays one of said corresponding golf holes within a predetermined length of time in response to said play monitoring signals in said data packet.

34. The method of claim 33 wherein said determining step comprises the step of:
   determining a length of time for the golfer to play one of said corresponding golf holes in response to said play monitoring signals in said data packet; and
   comparing a predetermined time against said length of time for the golfer to play in order to enable the determination of whether the golfer played the golf hole within the predetermined time.

35. The method of claim 33 wherein said modifying step comprises the step of modifying said data packet in response to said associated packet receiver receiving said data packet such that said data packet transmitted from said associated location transmitter comprises an address of a next sequential one of said packet receivers, so that said data packet is received by said next sequential packet receiver.

36. The method of claim 35 wherein said data packet receiving step comprises the step of receiving said data packet with a sequence of said packet receivers, in response to each said address of said next sequential packet receiver included in said data packet.

37. The method of claim 36 and further comprising the step of indicating a failure condition with said associated packet receiver, wherein said modifying step comprises the step of modifying said data packet in response to said associated packet receiver indicating said failure condition such that said data packet transmitted from said associated location transmitter comprises a different address, so that said sequence of said packet receivers is modified.

38. The method of claim 37 wherein said failure condition indicating step comprises the step of indicating said failure condition with said associated packet receiver in response to said associated packet receiver failing to receive said data packet within a predetermined time after said data packet is transmitted from said associated location transmitter.

39. The method of claim 36 wherein said determining step comprises the step of determining whether the golfer plays one of said corresponding golf holes within said predetermined length of time in response to said play monitoring signals in said data packet received by a selected one of said sequence of packet receivers.

* * * * *